May 8, 1951    S. G. WINGQUIST    2,551,779
CONSTANT VELOCITY UNIVERSAL JOINT
Filed July 3, 1945

Sven Gustaf Wingquist
By Glascock, Downing & Seebold,
attorneys

Patented May 8, 1951

2,551,779

UNITED STATES PATENT OFFICE 2,551,779

CONSTANT VELOCITY UNIVERSAL JOINT

Sven Gustaf Wingquist, Goteborg, Sweden

Application July 3, 1945, Serial No. 602,976
In Sweden July 4, 1944

5 Claims. (Cl. 64—21)

The invention relates to universal joints of the type having a single centre of deflection and comprising a driving and a driven joint member, each having arms provided with races between which are interposed rollers for transmitting motion between the joint members, the rollers being associated with a roll holder which in turn is associated with a bisecting member disposed between the joint members, connected thereto and operative to guide the roll holder for guiding the rollers substantially in the bisector plane of the joint members. According to the invention the joint members are of the type which may be assembled to working positions merely by movement in the axial direction of the joint, without any turning of the joint members, and the rollers, the roll holder and the bisecting member form a jointed assembly which as a whole may be inserted in and removed from the joint members. The object of this construction is to facilitate the assembly and the taking to pieces of the joint.

Two embodiments of the invention will be described in the following with reference to the accompanying drawing. In this Fig. 1 shows an axial and Fig. 2 a radial section through the first embodiment and Fig. 3 an axial section through the second.

Figure 1:
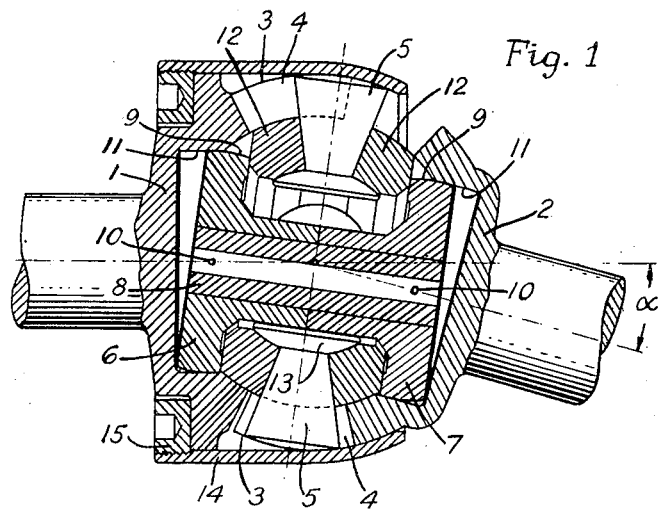
Figure 2:
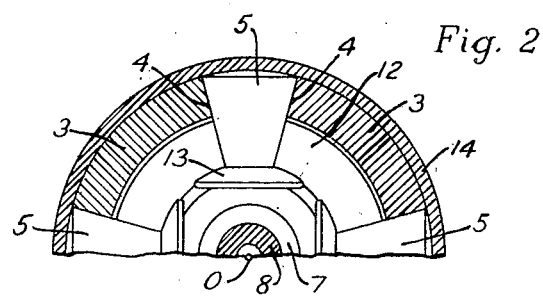

In the figures 1 denotes the driving and 2 the driven joint member, each having two arms 3 having a common inner spherical surface the centre of which is in the centre 0 of deflection of the joint. The arms have races 4 and between these are interposed rollers 5 for transmitting motion between the joint members.

For guiding the rollers in the bisector plane of the joint members the following means are provided.

Centrally between the joint members is disposed a bisecting member composed of two like halves 6 and 7 held together by means of a bolt 8 having press seats. The bisecting member 6, 7 has portions 9 which are spherical on the outside, the centres 10 of the spheres being on the axis of the joint, symmetrically relatively to the centre 0 of the joint. The spherical portions 9 rest in cylindrical seats 11 in the joint members 1 and 2.

12 denotes a roll holder, composed of two rings, which is slidable in the bisecting member 6, 7 in such a way that for each position it is always in a plane through the centre of the bisecting member and at right angles to the axis thereof. In order to prevent the rollers from falling out and to take up the forces acting on the rollers in the axial direction thereof they are provided with collars 13 having outer spherical surfaces engaging with the inside of the roll holder. Owing to the symmetrical arrangement of the bisecting member relatively to the centres 10 the bisecting member for each angle of deflection $a$ of the joint members deviates by an angle $a/2$ from the original position at right angles to the axis of the joint and thus also the rollers, guided by the roll holder, take up this position and are therefore always guided in the bisecting plane of the joint members. When the joint members are deflected the roll holder turns about the centre of the joint, in the plane of the paper as shown in Fig. 1 whereas the bisecting member is displaced in such manner that the central axis thereof no longer passes through the centre of the joint.

The bisecting member, the roll holder and the rollers form an undivided unit which as a whole may be inserted in and removed from the joint members, thus facilitating the assembly and the taking to pieces of the joint.

In order to hold the joint members together in an axial direction the joint is surrounded by a housing member 14 which at one end is secured to the joint member 1 by means of a screw ring 15 and at the other end with an inner spherical surface engages with the outer spherical surface of the joint member 2. The rollers at their outer ends have spherical surfaces engaging with the inner surface of the housing member 14.

Figure 3:
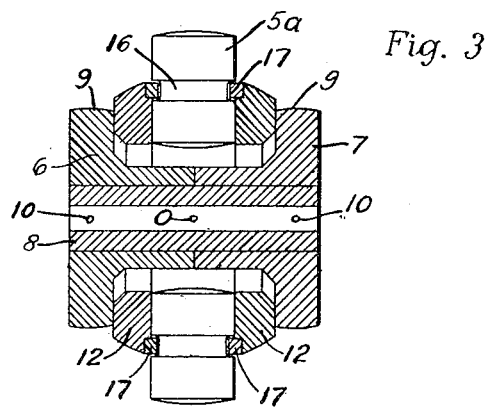

The embodiment shown in Fig. 3 differs from that shown in Fig. 1 only in that the rollers 5a are cylindrical and are held to the roll holder 12 by having grooves 16 entered by two rings 17 encircling the roll holder.

As indicated in Figure 3, the engagement between the surface of the groove 16 on the roller 5a that extends laterally outward of the axis thereof and the adjacent inner surface on the ring 17 prevents axial outward movement of the roller relative to the rings constituting the roll holder and secures the roll holder, rollers and bisector member together in jointed relationship. It is further to be noted that with respect to both modifications in Figures 1 and 3 the maximum outer dimensions of the rings is less than the inner spherical diameter of the arms or in other words the opening formed by the ends of the arms on the joint members permitting the roll holder to be assembled by movement in the axial direction of the joint members.

Any pull on the joint in an axial direction is taken up by the housing member and any pressure in the same direction by the roll holder.

What I claim is:

1. A universal joint of the type having a single center of deflection and comprising a driving and a driven joint member, arms on the joint members terminating in free ends, races on the arms, rollers interposed between the races, a roll holder for the rollers and a bisecting member disposed between the joint members, connected thereto and operative to guide the rollers substantially in the bisector plane of the joint members, the joint members being adapted to be assembled to working positions by movement in an axial direction, the rollers having projecting portions and the roll holder portions cooperating with said projecting portions for retaining the rollers in the roll holder, the roll holder being retained in the bisecting member, and the roll holder having such dimensions that it can pass through the opening formed by the free ends of the arms on the joint members, so that the rollers, the roll holder and the bisecting member can as a unit be inserted in and removed from the joint members.

2. A universal joint of the type having a single center of deflection and comprising a driving and a driven joint member, arms on the joint members terminating in free ends, races on the arms, rollers interposed between the races, a roll holder for the rollers and a bisecting member disposed between the joint members, connected thereto and operative to guide the rollers substantially in the bisector plane of the joint members, the joint members being adapted to be assembled to working positions by movement in an axial direction, the rollers extending inside of the roll holder and being provided with collars, the roll holder having portions cooperating with the collars for preventing the rollers from becoming disassociated from the roll holder and for taking up the forces acting on the rollers in the axial direction thereof, the roll holder being retained in the bisecting member, and the roll holder having such dimensions that it can pass through the opening formed by the free ends of the arms on the joint members, so that the rollers, the roll holder and the bisecting member can as a unit be inserted in and be removed from the joint members.

3. A universal joint of the type having a single center of deflection and comprising a driving and a driven joint member, arms on the joint members terminating in free ends, races on the arms, rollers interposed between the races, a roll holder for the rollers and a bisecting member disposed between the joint members, connected thereto and operative to guide the rollers substantially in the bisector plane of the joint members, the joint members being adapted to be assembled to working positions by movement in an axial direction, the roll holder having a spherical inner surface and the rollers extending inside of the roll holder and being provided with collars inside of the roll holder having spherical outer surfaces engaged with the spherical inner surface of the roll holder for securing the rollers to the roll holder, the roll holder being retained in the bisecting member and having such dimensions that it can pass through the opening formed by the free ends of the arms on the joint members so that the rollers, the roll holder and bisecting member can as a unit be inserted in and be removed from the joint members.

4. A universal joint of the type having a single center of deflection and comprising a driving and a driven joint member adapted for assembly to working position by movement toward each other in an axial direction of the joint and including arms on the joint members terminating in free ends, races on the arms, a bisecting member disposed between the joint members, operably connected therewith and including spaced parallel flanges, a roll holder comprising a pair of rings slideably mounted between the flanges of the bisecting member for radial movement with respect to the longitudinal axis of the bisecting member and retained in the bisecting member, rollers entering between the races and between the rings and rotatably mounted in the roll holder, said rollers including surfaces axially inward of the outer ends thereof and extending laterally outward of the axis of the roller, surfaces embodied with the rings of the roll holder and extending laterally of the radial axis of the roll holder and radially inward of the outer periphery of the roll holder and radially outward of and cooperating with the surfaces on the rollers and acting directly on said surfaces of the rollers and constituting the primary means for retaining the rollers, the rings of the roll holder and bisecting member in jointed unit relationship, the bisecting member guiding the rollers substantially in the bisector plane of the joint, and the spherical dimensions of the rings of the roll holder being less than the opening formed by the free ends of the arms on the joint members whereby the jointed assembly of bisecting member, roll holder and rollers can be inserted in and removed from the joint members by movement in the axial direction of the joint.

5. A universal joint as defined in and by claim 4 in which the rollers are cylindrical and are provided with grooves one face of which constitutes the surfaces axially inward of the outer ends of the rollers and extending laterally outward of the axis of the rollers and an additional ring embodied with each of the rings of the roll holder, said additional rings projecting into the grooves on the rollers and one face of said additional rings constituting the surfaces embodied with the rings of the roll holder and acting directly on the said surfaces of the rollers for retaining the rollers, rings and bisecting member in jointed unit relationship.

SVEN GUSTAF WINGQUIST.

REFERENCES CITED

The following references are of record in the file of this patent:

UNITED STATES PATENTS

| Number | Name | Date |
|---|---|---|
| 1,625,410 | De Ram | Apr. 19, 1927 |
| 1,983,533 | Brown | Dec. 11, 1934 |
| 2,293,717 | Dodge | Aug. 25, 1942 |

FOREIGN PATENTS

| Number | Country | Date |
|---|---|---|
| 563,328 | Germany | 1932 |